US012736143B1

(12) United States Patent
Mjelde

(10) Patent No.: US 12,736,143 B1
(45) Date of Patent: Sep. 15, 2026

(54) SKIMMER TO MAIN DRAIN DIVERTER VALVE

(71) Applicant: AquaStar Pool Products, Inc., Venura, CA (US)

(72) Inventor: Olaf Mjelde, Ventura, CA (US)

(73) Assignee: AQUASTAR POOL PRODUCTS, INC., Ventura, CA (US)

( * ) Notice: Subject to any disclaimer, the term of this patent is extended or adjusted under 35 U.S.C. 154(b) by 0 days.

(21) Appl. No.: 19/562,604

(22) Filed: Mar. 10, 2026

(51) Int. Cl.
*F16K 11/16* (2006.01)
*E04H 4/12* (2006.01)
*F16K 35/14* (2006.01)

(52) U.S. Cl.
CPC .......... *F16K 11/166* (2013.01); *E04H 4/1236* (2013.01); *E04H 4/1245* (2013.01); *E04H 4/1272* (2013.01); *F16K 35/14* (2013.01)

(58) Field of Classification Search
CPC ..... F16K 11/166; F16K 35/14; E04H 4/1236; E04H 4/1245; E04H 4/1272
See application file for complete search history.

(56) References Cited

U.S. PATENT DOCUMENTS 3,528,448 A * 9/1970 Urban .................. F16K 5/0642 251/173
3,706,379 A * 12/1972 Erlich .................. E04H 4/1272 210/123
3,910,840 A * 10/1975 Adam .................. E04H 4/1272 210/91
4,126,925 A * 11/1978 Jacuzzi ................ E04H 4/1272 4/490
4,154,679 A 5/1979 Farage
4,325,462 A * 4/1982 Gouzos ................ E04H 4/1272 4/488
4,454,035 A 6/1984 Stefan
5,329,648 A 7/1994 Davey
6,048,453 A 4/2000 King, Jr.
8,555,989 B1 10/2013 Agajanian
9,428,929 B2 * 8/2016 Prendergast .......... E04H 4/1272
2006/0059615 A1 3/2006 Beaton

* cited by examiner

*Primary Examiner* — Angelisa L. Hicks
(74) *Attorney, Agent, or Firm* — Cislo & Thomas LLP

(57) ABSTRACT

A main drain to diverter valve assembly for a swimming pool circulation system is disclosed. The valve assembly is configured to selectively control suction balance and water flow between a skimmer inlet and a main drain outlet. The assembly includes a housing enclosing to interconnected valves configured to move simultaneously, where a first valve controls skimmer inlet suction and water flow and second valve controls main drain suction and water flow. The main drain diverter valve assembly is configured to provide multiple selectable flow modes, including full skimmer flow, full main drain flow, and combined flow modes. The main drain to diverter valve assembly is adapted for installation in existing pool skimmers and provides improved usability, durability, and ease of replacement.

20 Claims, 17 Drawing Sheets

SKIMMER TO MAIN DRAIN DIVERTER VALVE

FIELD OF THE INVENTION

The present invention relates generally to swimming pool circulation systems, and more particularly to valve assemblies used in pool skimmers to control suction flow between a skimmer and a main drain.

BACKGROUND OF THE INVENTION

Swimming pool circulation systems are designed to maintain water clarity, sanitation, and debris removal by continuously drawing water from the pool through a filtration system. Many residential and commercial pools employ a combination of a surface skimmer and a submerged main drain to optimize debris collection and water circulation. The skimmer primarily removes floating debris from the pool surface, while the main drain assists in circulating deeper water and removing settled debris.

To regulate suction between the skimmer and the main drain, skimmer inlet to suction outlet valve assemblies are commonly installed within skimmer housings. These valve assemblies allow an operator to selectively control the proportion of suction applied to the main drain and skimmer inlets. Proper adjustment of suction flow is important for maintaining effective cleaning performance, preventing air entrainment, and avoiding pump cavitation.

However, conventional skimmer inlet to suction outlet valves suffer from several drawbacks. Over time, internal valve components may wear, warp, or degrade due to prolonged exposure to water, chemicals, and mechanical stress. Such degradation can result in reduced sealing performance, imprecise flow control, or complete malfunction. In many cases, existing valves are difficult to adjust, require tools to reposition, or do not clearly indicate available flow settings, leading to improper operation by pool owners or service technicians.

Additionally, many existing replacement valves are not designed for straightforward retrofit into common skimmer housings, requiring modification or complete replacement of the skimmer assembly. Some valve designs also fail to provide clearly defined flow modes, limiting the operator's ability to select between full skimming, full main drain suction, or a balanced combination of both.

Accordingly, there exists a need for an improved skimmer and main drain inlet to suction outlet assembly that is durable, easy to operate, compatible with widely used skimmer systems, and capable of providing clearly selectable and repeatable suction flow modes. Such an assembly should be simple to install as a replacement component and should allow users to quickly adjust pool cleaning behavior without specialized tools or training.

SUMMARY OF THE INVENTION

The present invention addresses the foregoing needs by providing a main drain diverter valve assembly configured for use in swimming pool circulation systems. A representative pool circulation system will typically comprise a main drain installed in the bottom of the pool, a skimmer configured to draw water from the pool surface, a pool pump configured to draw water or apply suction, through the main drain or skimmer and expel water through a filter where the water is subsequently returned to the pool. The main drain, skimmer, pool pump and filter are interconnected by water pipes. The main drain diverter valve assembly of the present invention is installed in the skimmer and provides the ability to selectively adjust suction balance and water flow between the skimmer and the main drain.

The main drain to diverter valve assembly includes a housing containing two ganged or physically coupled valves configured to move simultaneously, where a first valve or door valve controls skimmer inlet suction and water flow and second valve or butterfly valve controls main drain suction and water flow. The main drain diverter valve assembly is configured to provide multiple selectable flow modes, including full skimmer flow, full main drain flow, and multiple combined flow modes.

The disclosed main drain diverter valve assembly provides among other features: (1) a linked dual valve system—the door valve for skimmer control and the butterfly valve for main drain control are mechanically linked through a splined interface such that both valves move in unison: (2) single-knob control—a single locking knob is used to control both the door and butterfly valves; (3) a locking mechanism—a serrated interface is used between the door valve and a top cover of the housing that locks the door valve and butterfly valve positions via the locking knob, thereby preventing accidental misadjustment; (4) compact integration—the main drain diverter valve assembly is installed directly in a skimmer base rather than in external plumbing; (4) a removable retention system—threaded adapters with O-rings and screws secure the main drain diverter valve assembly to standard skimmer ports while allowing removal for service; and (5) multiple flow positions—the linkage geometry allows multiple distinct flow states, enabling precise tuning of skimmer to main drain suction and flow balance.

The main drain diverter valve assembly of the present invention provides at least the following functional and commercial advantages: simplified flow adjustment between skimmer and drain; reduced need for external diverter valves or multiple fittings; allows service personnel to quickly adjust suction and flow at the skimmer; provides a secure, repeatable lock-in-place setting; and, is compatible with existing skimmer housings.

By providing a durable, intuitive, and retrofittable main drain to diverter valve assembly with multiple selectable flow modes, the present invention improves upon pool circulation control, enhances cleaning performance, and simplifies maintenance for pool owners and service professionals.

The above and other features and advantages of the present invention will become apparent from the following detailed description, taken in conjunction with the accompanying drawings.

DETAILED DESCRIPTION OF THE PREFERRED EMBODIMENTS

The present invention will now be described in detail with reference to exemplary embodiments. It is to be understood that the disclosed embodiments are illustrative and not limiting, and that variations and modifications may be made without departing from the scope of the invention as defined by the appended claims.

The main drain diverter valve assembly of the present invention is configured for installation within a swimming pool skimmer housing that is fluidly connected to a pool pump. The main drain diverter valve assembly regulates suction flow between a skimmer inlet configured to draw water from the pool surface and a main drain inlet configured to draw water from the bottom or a lower region of the pool. The main drain diverter valve assembly of the present invention provides an adjustable linkage which interconnects a first or door valve controlling the skimmer inlet and a second or butterfly valve controlling the main drain line. Adjustment of a single external control knob allows a service technician to vary the suction balance and water flow ratio between the skimmer and main drain with fine precision.

Figure 1:
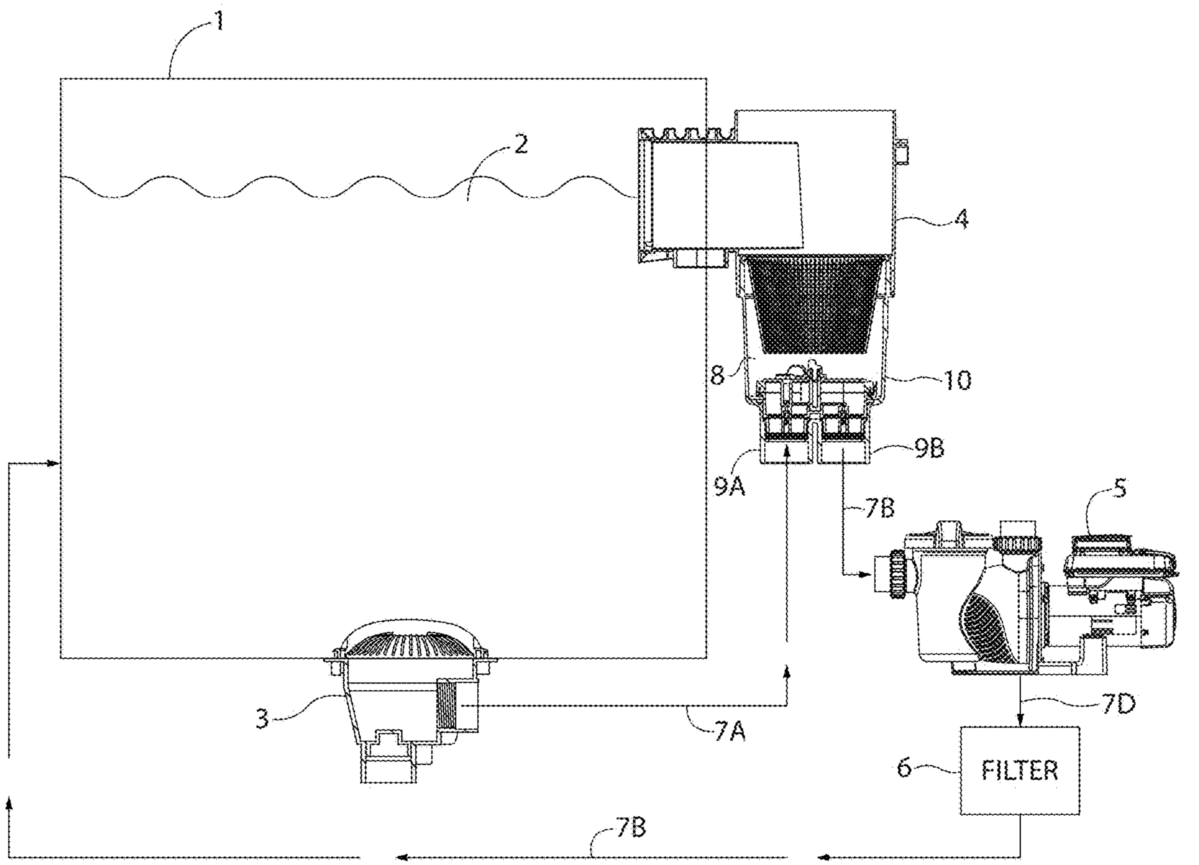
FIG. 1 is a schematic view of a swimming pool plumbing configuration incorporating the main drain diverter valve assembly of the present invention.
Figure 2:
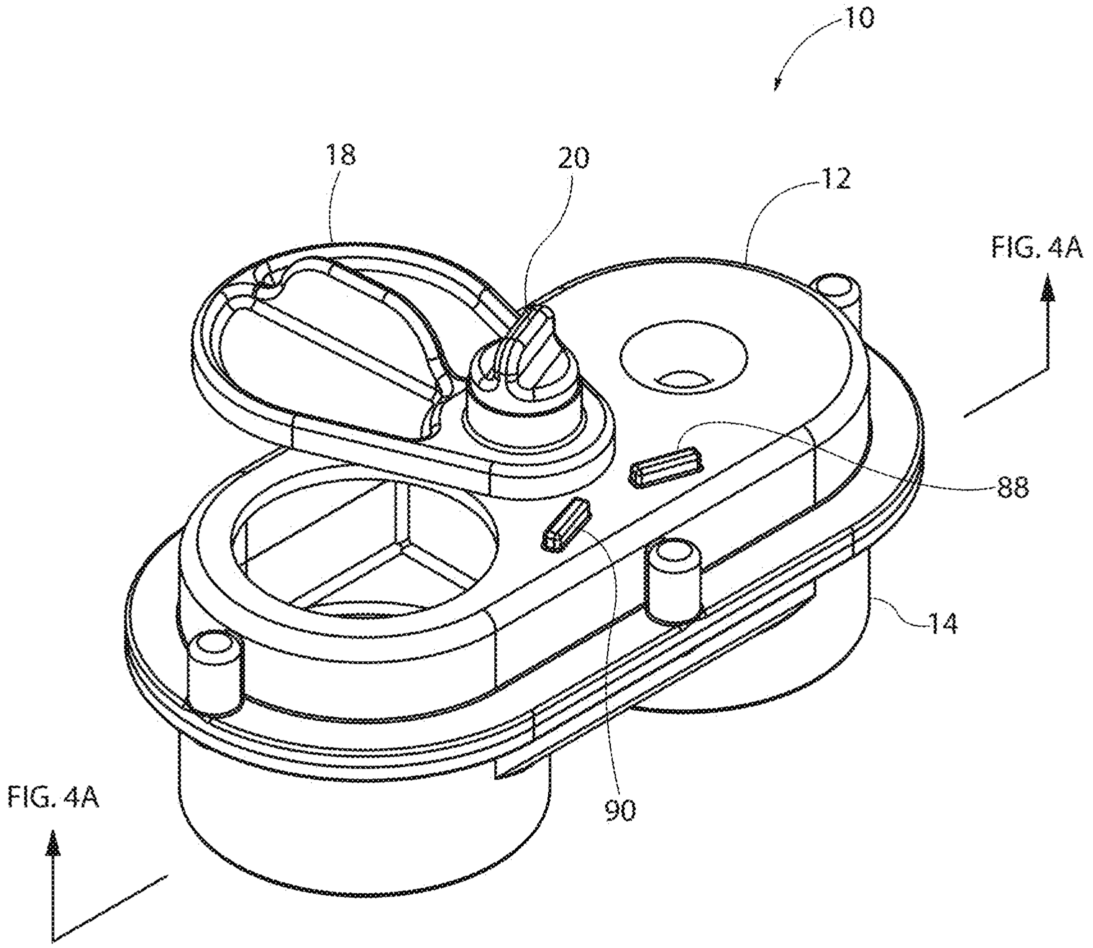
FIG. 2 is a perspective view of the main drain diverter valve assembly of the present invention.
Figure 3:
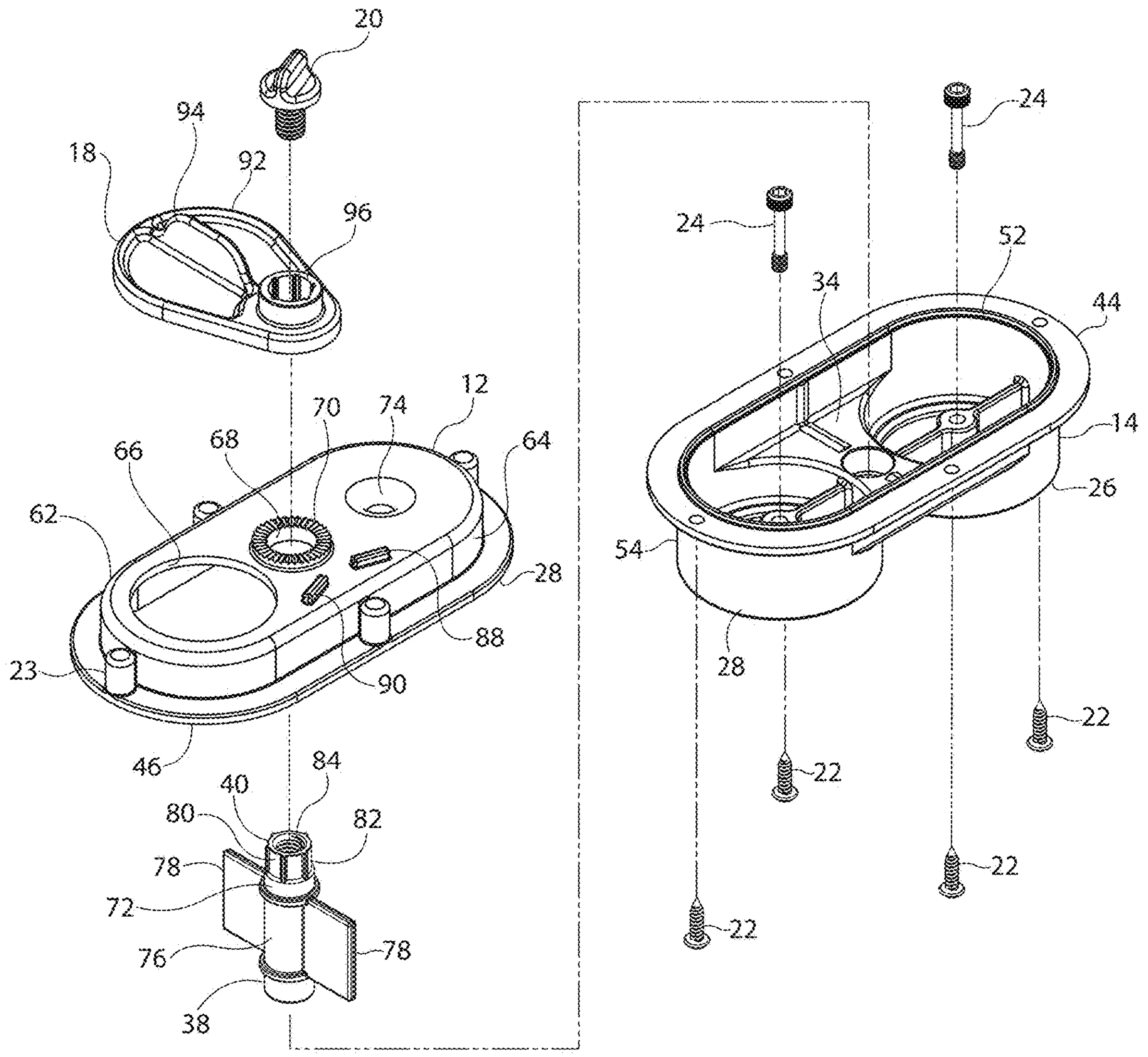
FIG. 3 is an exploded view of the main drain diverter valve assembly of FIG. 2.
Figure 4A:
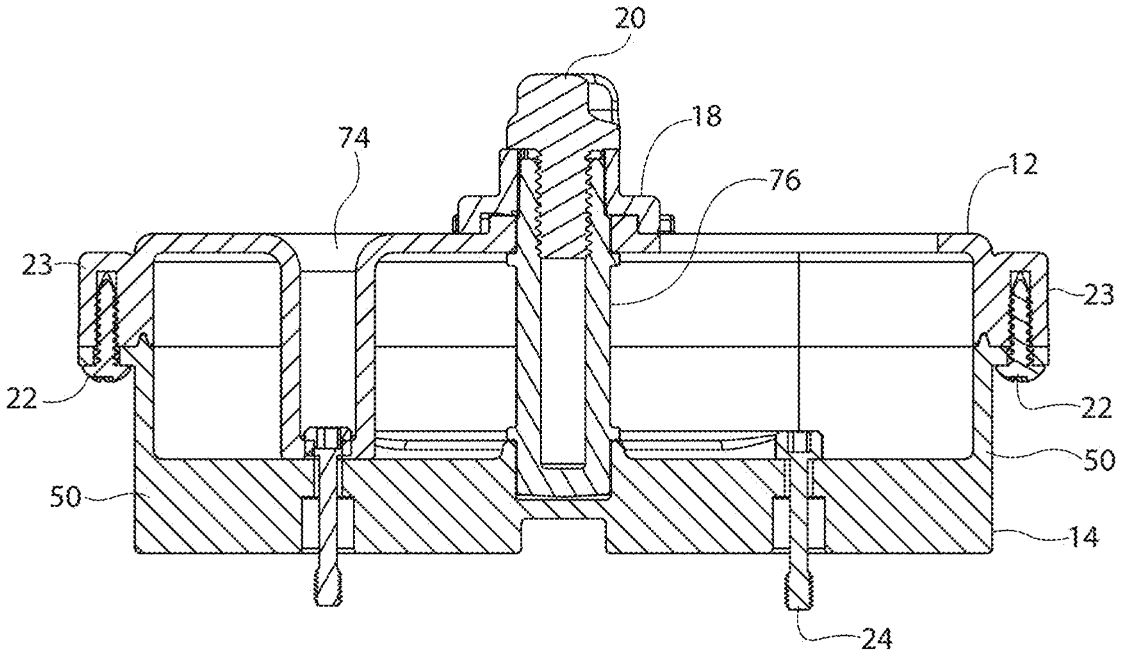
FIG. 4A is a cross-sectional view of the top cover of the main drain diverter valve assembly taken along the line 4A-4A of FIG. 2, with the door valve rotated 135 degrees clockwise from its fully closed position.
Figure 5A:
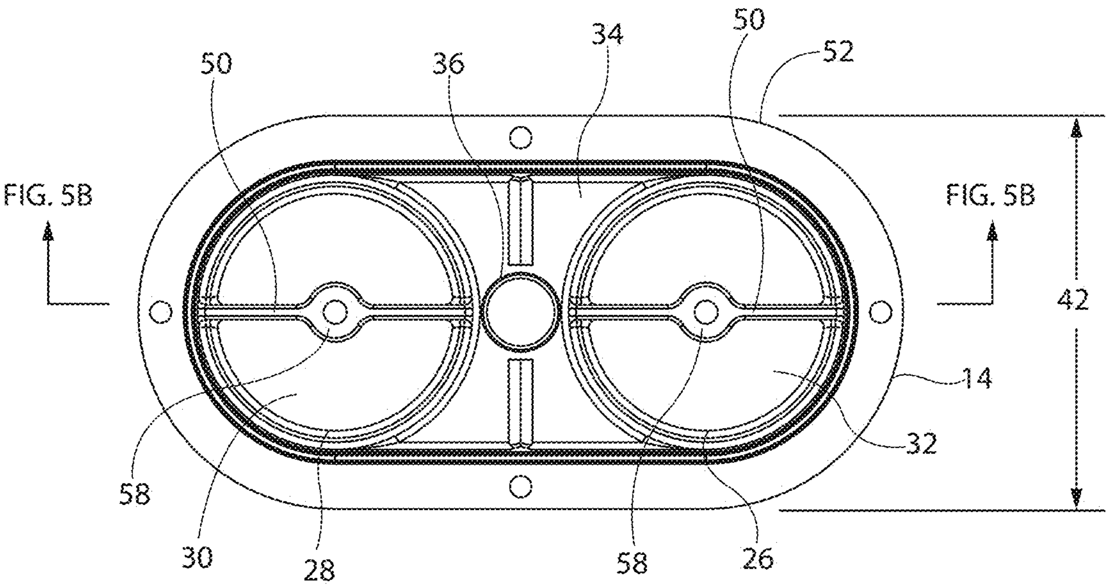
FIG. 5A is a top view of the bottom cover of the main drain diverter valve assembly of FIG. 2.
Figure 5B:
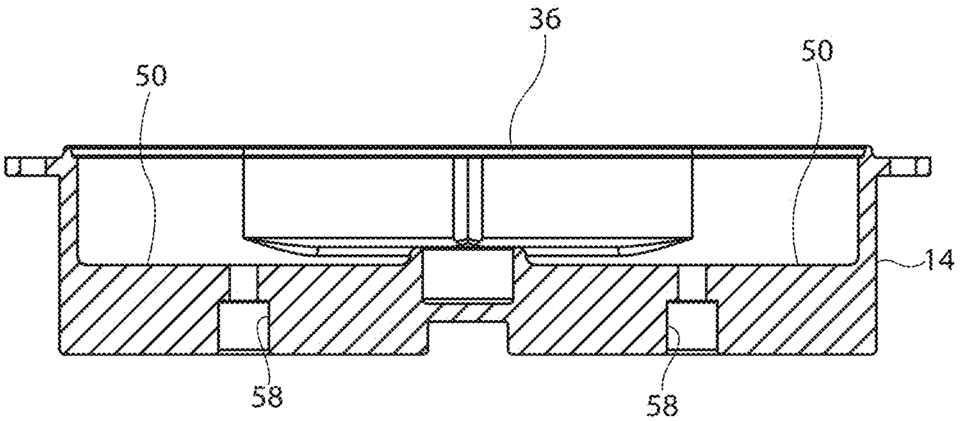
FIG. 5B is a cross-sectional view of the bottom cover of the main drain valve assembly taken along the line 5B-5B of FIG. 5A.
Figure 6A:
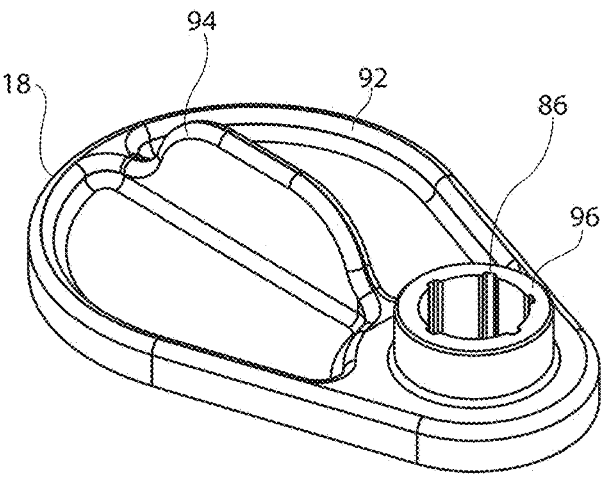
FIG. 6A is top perspective view of the door valve of main drain diverter valve assembly of the present invention.
Figure 6B:
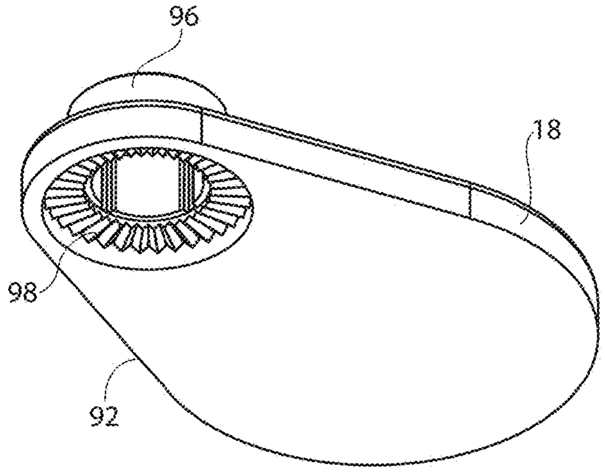
FIG. 6B is bottom perspective view of the door valve of main drain diverter valve assembly of the present invention.
Figure 7:
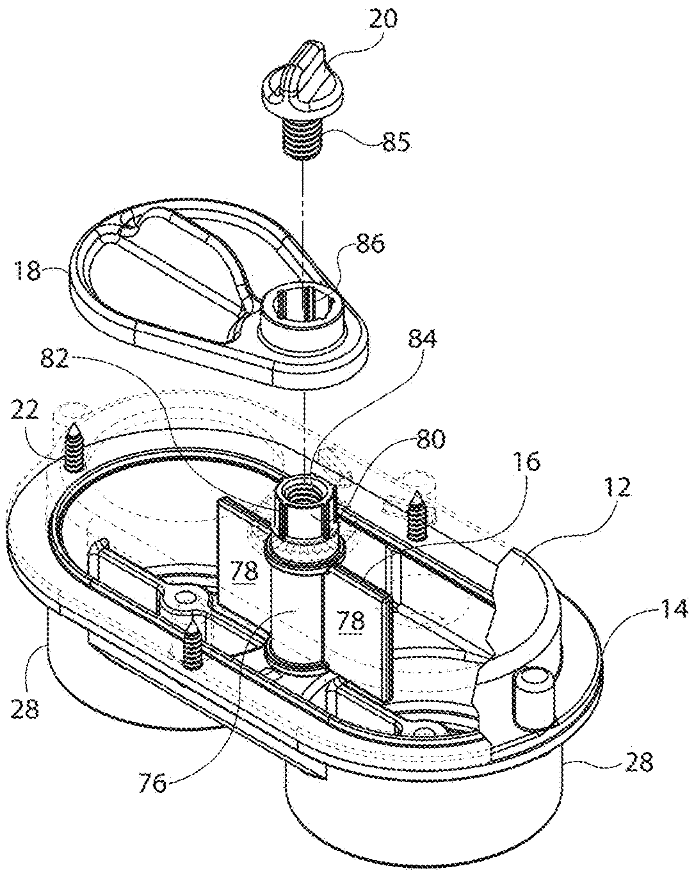
FIG. 7 is a partially exploded perspective view illustrating the attachment between a butterfly valve and a door valve of the main drain diverter valve assembly of FIG. 2.
Figure 8:
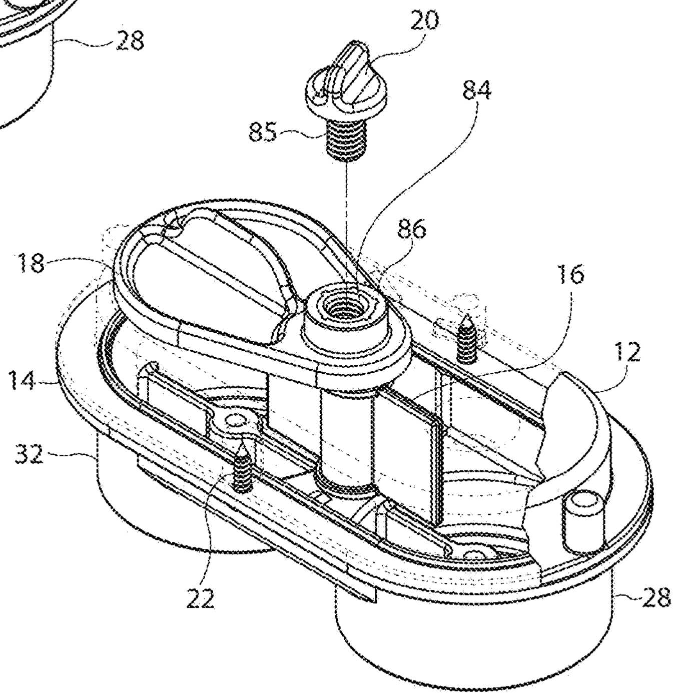
FIG. 8 is a partially exploded perspective view illustrating the interface between a locking knob and the butterfly valve of the main drain diverter valve assembly of FIG. 2.

With reference to FIG. 1, a schematic representation of a pool circulation system suitable for use with the main drain diverter valve assembly 10 of the present invention is shown. A representative circulation system will typically comprise a pool 1 containing water 2, a main drain 3 installed in a bottom or lower region of the pool, a skimmer 4 installed near the water line of the pool so as to draw water from the pool surface, a pool pump 5 configured to draw water, i.e. apply suction, through the main drain 3 and the skimmer 4 and expel water through a filter 6, where the filtered water is subsequently returned to the pool 1. The main drain 3, skimmer 4, pool pump 5 and filter 6 are interconnected by water pipes or conduits 7A, 7B, 7C and 7D, as shown. The main drain diverter valve assembly 10 of the present invention is installed in the skimmer 4 and provides the ability to adjust water flow and suction balance between the skimmer 4 and main drain 3.

With reference to FIGS. 1-11, the main drain diverter valve assembly 10 of the present invention comprises a top cover 12, a bottom cover 14, a first valve or door valve 18, a second valve or butterfly valve 16, and, a locking knob 20. The main drain diverter valve assembly 10 is configured to be installed within a well 8 of a pool skimmer 4.

In the exemplary embodiment, the bottom cover 14 has a generally race-track shaped perimeter 52 and a vertical wall 54 and includes a generally circular first well 26 having a main drain inlet opening or second inlet opening 30 and a generally circular second well 28 having a pump outlet opening 32. The main drain inlet opening 30 receives water flow from the swimming pool main drain 3 via water conduit or suction line 7A. The pump outlet opening 32 provides water flow to the pool pump 5 via water conduit or suction line 7B.

In between the first and second wells 26 and 28 is a bridge element 34 having a width 42 that includes an aperture 36 for receipt of a lower end 38 of a generally, cylindrical tube 76 of the butterfly valve 16. The diameter of the aperture 36 is configured to form a slip-fit with the lower end 38 of the butterfly valve 16 so that the butterfly valve 16 may rotate freely within the aperture 36. The butterfly valve 16 is configured such that when it is positioned across the width 42 of the bridge element 34, water is prevented from flowing from the first well 26 to the second well 28, i.e. water is prevented from flowing from the main drain 3 to the pool pump 5.

Figure 19:
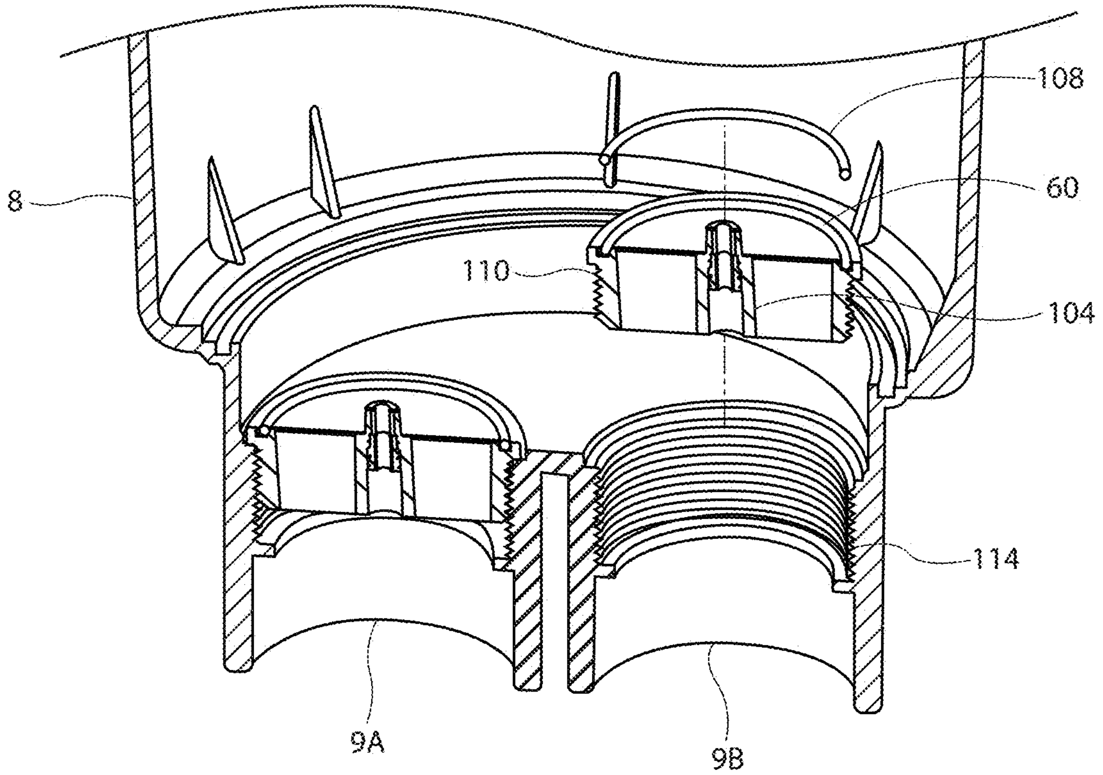
FIG. 19 is a cross-sectional, perspective view showing the adapter of FIG. 17 installed in a skimmer housing.
Figure 20:
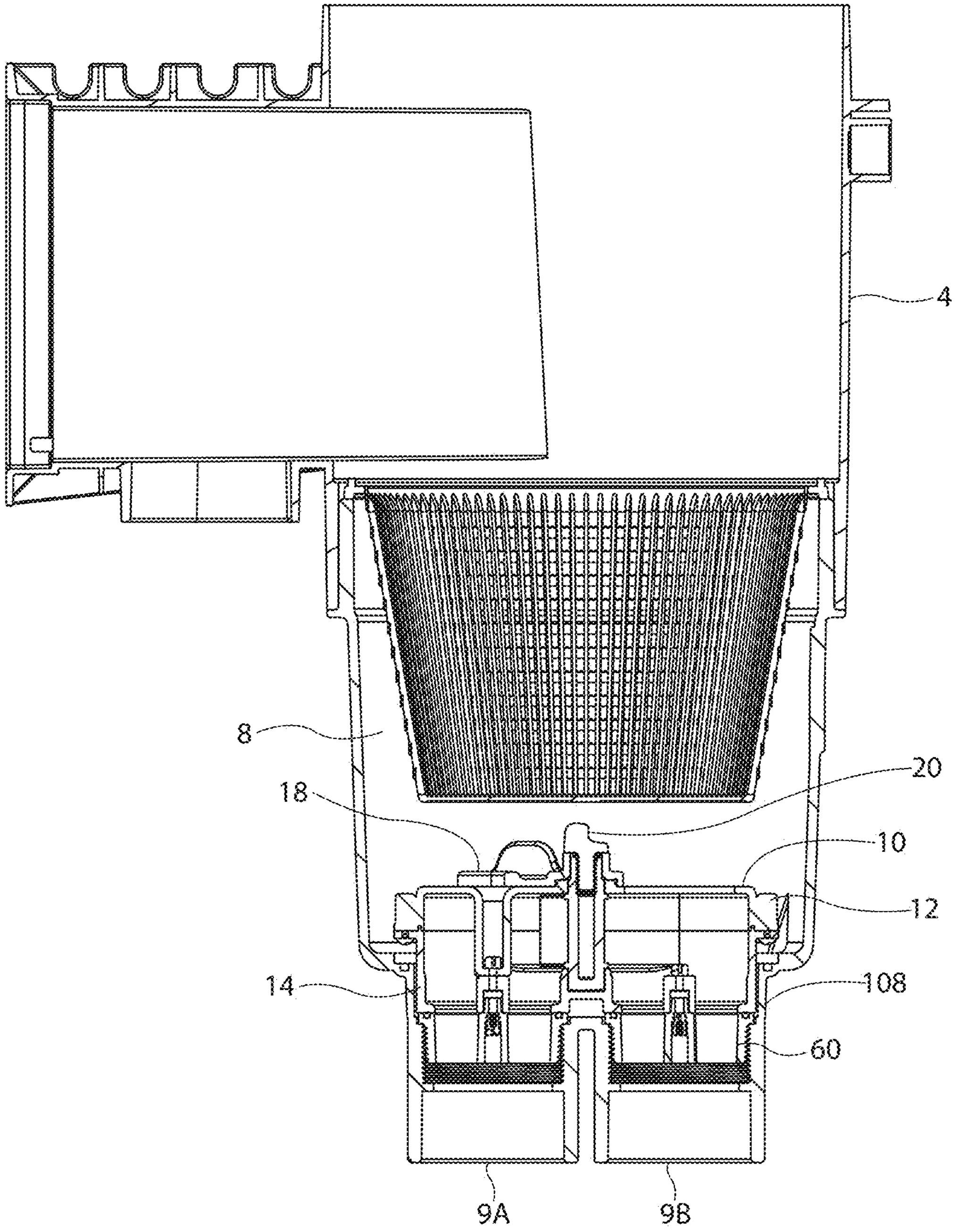
FIG. 20 is a partial, cross-sectional view showing the main drain diverter valve assembly of the present invention, installed in a skimmer housing using the adapter of FIG. 17.

The bottom cover 14 also includes a flange 44 which mates with a flange 46 of the top cover 12. Disposed in the first and second wells 26 and 28 are hollow bosses 58 which allow the bottom cover 14 to be attached to skimmer 8 by means of an adapter 60 (see FIG. 19) via attachment screws 24. The hollow bosses 58 are attached to the first and second wells 26 and 28 via webbing 50.

With continued reference to FIGS. 1-11, in the exemplary embodiment, the top cover 12 has a generally race-track shaped perimeter 62 and a vertical wall 64 and includes a generally circular, skimmer inlet opening or first inlet opening 66, which receives water flow from the skimmer 4.

Formed in the top cover 12 is an aperture 68 which is configured to be in a slip fit relationship with a shoulder portion 72 of the upper end 40 of the butterfly valve 16, such that the butterfly valve 16 may freely rotate within the aperture 68.

The top cover 12 also includes a clockwise rotation stop 88 and a counterclockwise rotation stop 90. The clockwise and counterclockwise rotation stops 88 and 90 serve to limit clockwise and counterclockwise rotation of the door valve 18. Also formed as part of the top cover 12 is an access tube 74 which allows the attachment screw 24 to be placed into the hollow boss 58 and which then attaches to one of the adapters 60 used to secure the main drain diverter valve assembly 10 to a skimmer 4.

The butterfly valve 16 comprises the generally cylindrical tube 76, which has with two flaps 78 spaced 180 degrees apart, extending from the surface of the tube. The cylindrical tube 76 includes the lower end 38 and the upper end 40. The upper end 40 includes the shoulder portion 72. As referenced above, the lower end 38 of the cylindrical tube 76 is configured to rotate freely within the aperture 36 of the bottom cover 14 and the shoulder portion 72 of the upper end 40 of the cylindrical tube 76 is configured to rotate freely in the aperture 68 of the top cover 12. The upper end 40 of the cylindrical tube 76 includes a splined portion 80 having a plurality of external splines 82, which mate with a plurality of internal splines 86 formed in the door valve 18. The upper end 40 of the cylindrical tube 76 of the butterfly valve 16 is also internally threaded, i.e. includes an internal thread 84 which allows the upper end 40 of the tube cylindrical 76 to receive the locking knob 20.

With continued reference to FIGS. 1-11, the door valve 18 is configured such it is rotatable and able to fully or partially close off the skimmer inlet opening 66 in the top cover 12. The door valve 18 includes a body 92, a manual adjustment tab 94 and a hub 96. The hub 96 includes one or more internal splines 86 which mate with the external splines 84 of the splined portion 80 of the upper end 40 of the tube 76. In this manner, the door valve 18 is physically connected to the butterfly valve 16 and therefore moves in unison with the butterfly valve 16. In the exemplary embodiment, the butterfly valve 16 includes five (5) external splines 82 and door valve 18 includes five mating internal splines 86. This allows the position of the door valve 18 to be "clocked" relatively to the position of the butterfly valve, if desired. For example, this allows the door valve 18 to be positioned such that the door valve 18 is closed when the butterfly valve 16 is open. Alternatively, rather than the splined interface disclosed above, the linkage between the door valve 18 and butterfly valve 16 could be geared, cam-based, or magnetically coupled.

Figure 9:
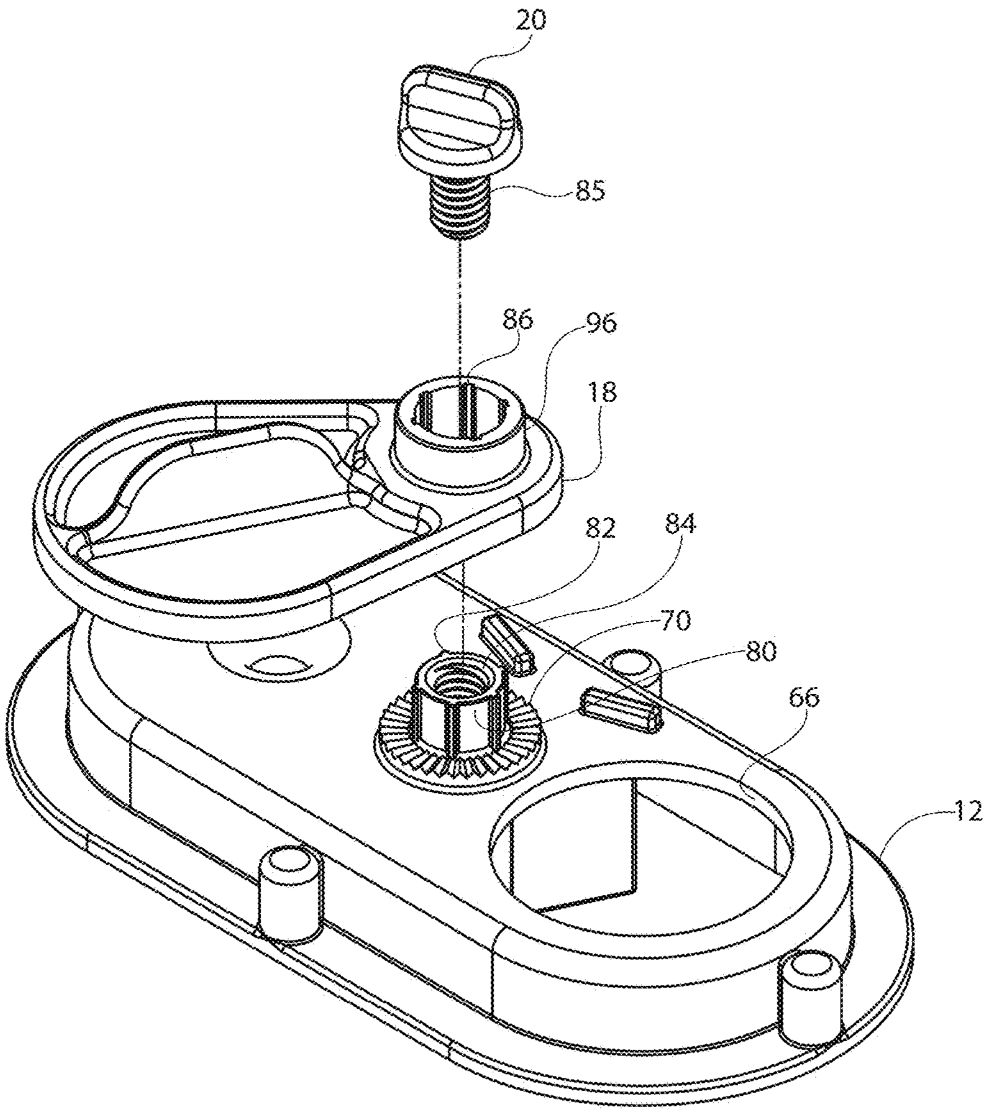
FIG. 9 is a partially exploded perspective view illustrating a locking feature of the main drain diverter valve assembly of FIG. 2.
Figure 10:
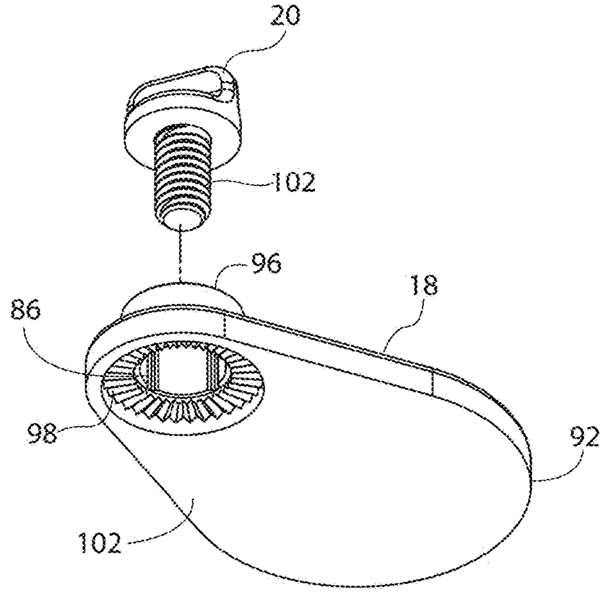
FIG. 10 is a partially exploded perspective view illustrating a locking feature of the main drain diverter valve assembly of FIG. 2.
Figure 11:
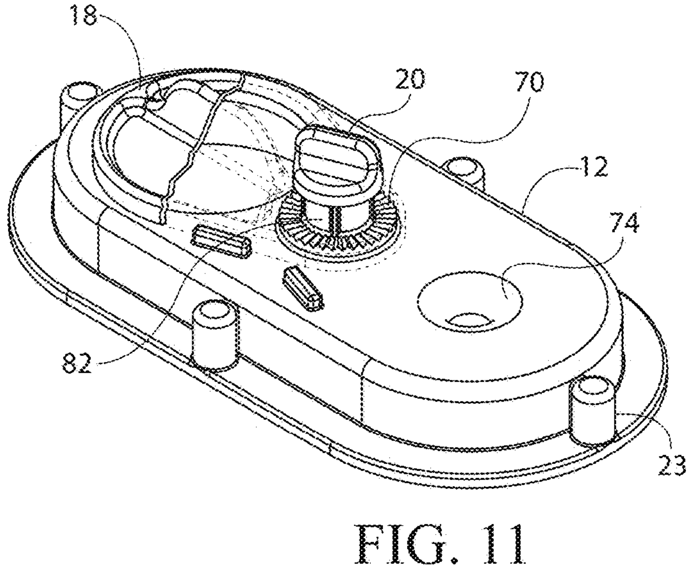
FIG. 11 is a cross-sectional view of the of the main drain diverter valve assembly taken along the line A-A of FIG. 2.

With reference to FIGS. 1-11 and with particular reference to FIGS. 9-10, an underside 102 of the body 92 of the door valve 18 has a plurality of serrations 98 which mate with a plurality of serrations 70 formed about the aperture 68 in the top cover 12. These mating pluralities of serrations 70 and 98, in conjunction with the locking knob 20, form a locking feature 100 which allows a user to lock the door valve 18 and the butterfly valve 16 in any particular position desired by the user. That is, as the butterfly valve 16 is ganged or physically interconnected to the door valve 18 by means of the external splines 82 of the door valve 18 mating with the internal splines 86 of the butterfly valve 16, both the door and butterfly valves 18 and 16 are constrained to move together and thus both are lockable in a plurality of fixed positions via the locking feature 100.

The locking knob 20 has an external thread 85 which engages the internal thread 84 of the butterfly valve 16. Tightening the locking knob 20 causes the plurality of serrations 70 of the top cover 12 to engage with the plurality of serrations 98 of the door valve 18. Alternatively, the locking feature 100 may comprise spring detents, ratchet teeth, or friction plates.

To assemble the main drain diverter valve assembly 10, the lower end 38 of the cylindrical tube 76 of the butterfly valve 16 is inserted into the aperture 68 of the bottom cover 14 and the upper end 40 of the cylindrical tube 76 is inserted into the aperture 36 of the top cover 12. In the exemplary embodiment, the top cover 12 and bottom cover 14 are secured to each other by means of fasteners, such as screws 22 and screw bosses 23 (see FIG. 3).

With reference to FIGS. 1 and 17-20, the main drain diverter valve assembly 10 is installed in a skimmer 4 by means of two adapters 60, where one adapter 60 threads into a suction inlet port 9A of a skimmer 4 and the other adapter 60 threads into a suction outlet port 9B of a skimmer 4. The main drain diverter valve assembly 10 is oriented in a skimmer 4 such that the door valve 18 faces upwardly into a well 8 of the skimmer 4.

The adapter 60 is a hollow, cylindrical component having an external thread 110 that mates with an internal thread 114 of a skimmer suction inlet port 9A, as well as with those of skimmer suction outlet port 9B. Suspended in the center of the adapter 60 via webbing 106 is a threaded boss 104 having an internal thread 112 which receives the attachment screws 24, which pass through the hollow bosses 58 formed in the bottom cover 14. An O-ring gasket 108 will typically be disposed between the main drain inlet and pump outlet openings 30 and 32 of the bottom cover 14 of the main drain diverter valve assembly 10 and adapters 60, prior to installation of the attachment screws 24. Tightening of the attachment screws 24 secures the bottom cover 14 to the adapters 60 and thereby the skimmer 4. Alternatively, the main drain diverter valve assembly 10 could be attached to a skimmer via snap-fit features rather than threaded adapters or could be secured directly to screw holes in the base of the skimmer.

Flow States of the Main Drain Diverter Valve Assembly

With reference to FIGS. 12-16, in the exemplary embodiment the door valve 18 and butterfly valve 16 are aligned via the external splines 82 and the internal splines 86, such that when the door valve 18 is fully closed, the butterfly valve 16 is fully open. (See FIG. 15.)

Since both the door valve 18 and the butterfly valve 16 are mechanically interconnected via the external and internal splines 82 and 86, adjusting the door valve's position simultaneously changes the butterfly valve's position. This linkage provides for multiple combinations of valve positions and consequently flow conditions between the skimmer 4 and the main drain 3, allowing precise control of circulation balance.

Figure 12:
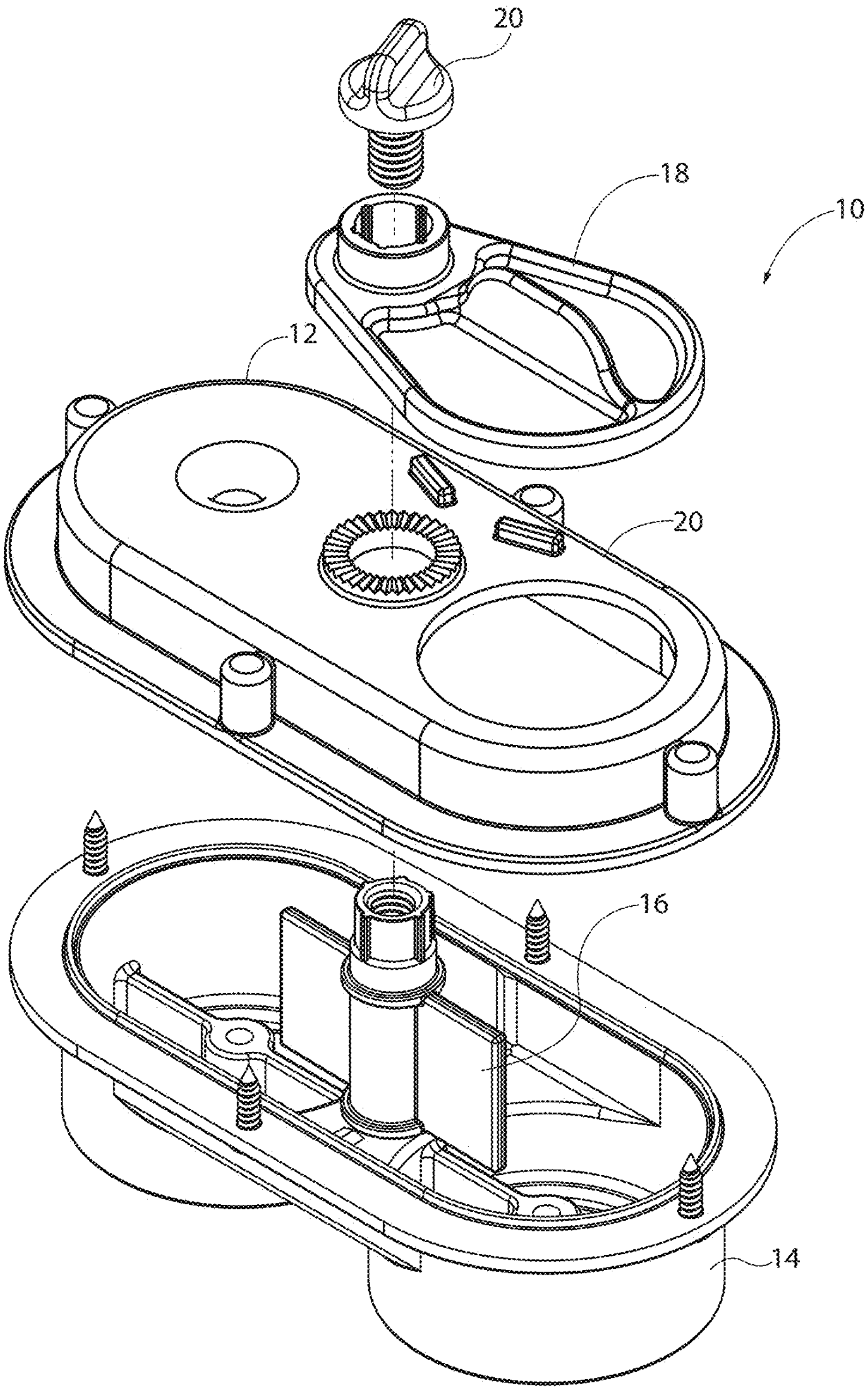
FIG. 12 is an exploded, perspective view of the main drain diverter valve assembly of FIG. 2, showing the position of the butterfly valve when the door valve is fully closed.
Figure 14:
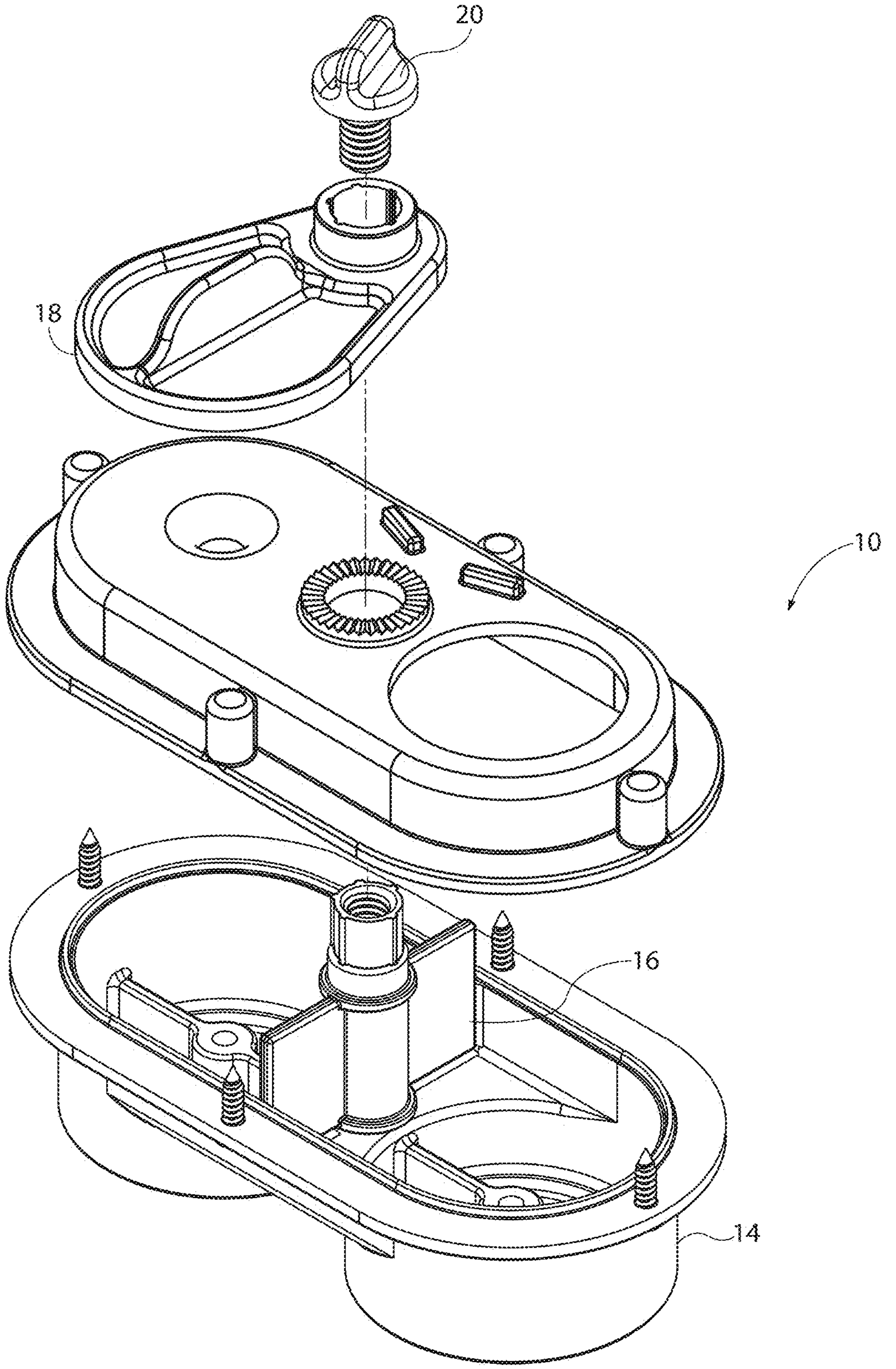
FIG. 14 is an exploded, perspective view of the main drain diverter valve assembly of FIG. 2, showing the position of the butterfly valve when the door valve is rotated approximately 90 degrees clockwise from its fully closed position.
Figure 15:
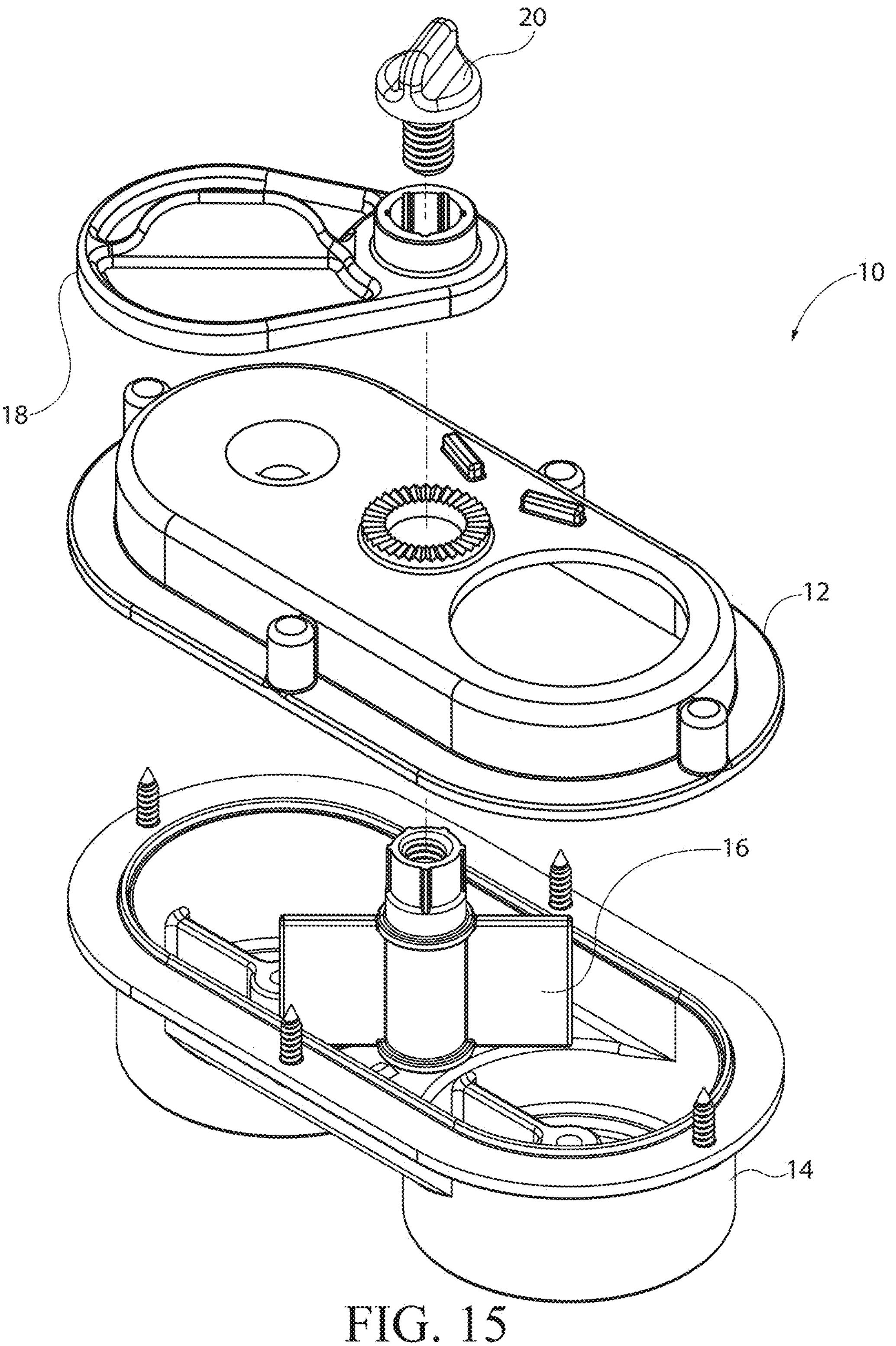
FIG. 15 is an exploded, perspective view of the main drain diverter valve assembly of FIG. 2, showing the position of the butterfly valve when the door valve is rotated approximately 135 degrees from the fully closed position.

FIG. 12 shows the door valve 18 in its fully closed position, i.e. in its zero degree position. With reference to FIG. 14, at 90 degrees of rotation clockwise from its fully closed position, the door valve 18 is fully open. With reference to FIGS. 14 and 15, from 90 to 180 degrees of rotation from the fully closed position, the door valve 18 remains fully open. Note that the counter-clockwise rotation stop 90 prevents the door valve 18 from rotating counter-clockwise and the clockwise rotation stop 88 limits maximum clockwise rotation.

As the door valve 18 and butterfly valve 16 are physically connected, the butterfly valve 16 moves in unison with door valve 18. The starting positions of the two valves however are different. That is, when the door valve 18 is fully closed, i.e. is in the zero degree position, the butterfly valve 16 is fully open, as shown in FIG. 12. When the door valve 18 has rotated 90 degrees clockwise from its fully closed position to its fully open position, the butterfly valve 16 has moved from its fully open position to its fully closed position, as shown in FIG. 14. The butterfly valve 16 has two fully open positions, the first position occurs when the door valve 18 is in its fully closed position, i.e. zero degree position, and the second occurs when the door valve 18 has rotated 180 degrees clockwise from its fully closed position.

Representative flow states for the main drain diverter valve assembly 10 of the present invention are shown in FIGS. 12-16. FIG. 12 shows the door valve 18 in the fully closed position, which corresponds to the butterfly valve 16 being in the fully open position. In this valve state, maximum or full suction is applied to the main drain 3 by the pool pump 5 and no suction is applied to the skimmer 4. This corresponds to maximum or full water flow through the main drain 3 and no water flow through the skimmer 4.

Figure 13:
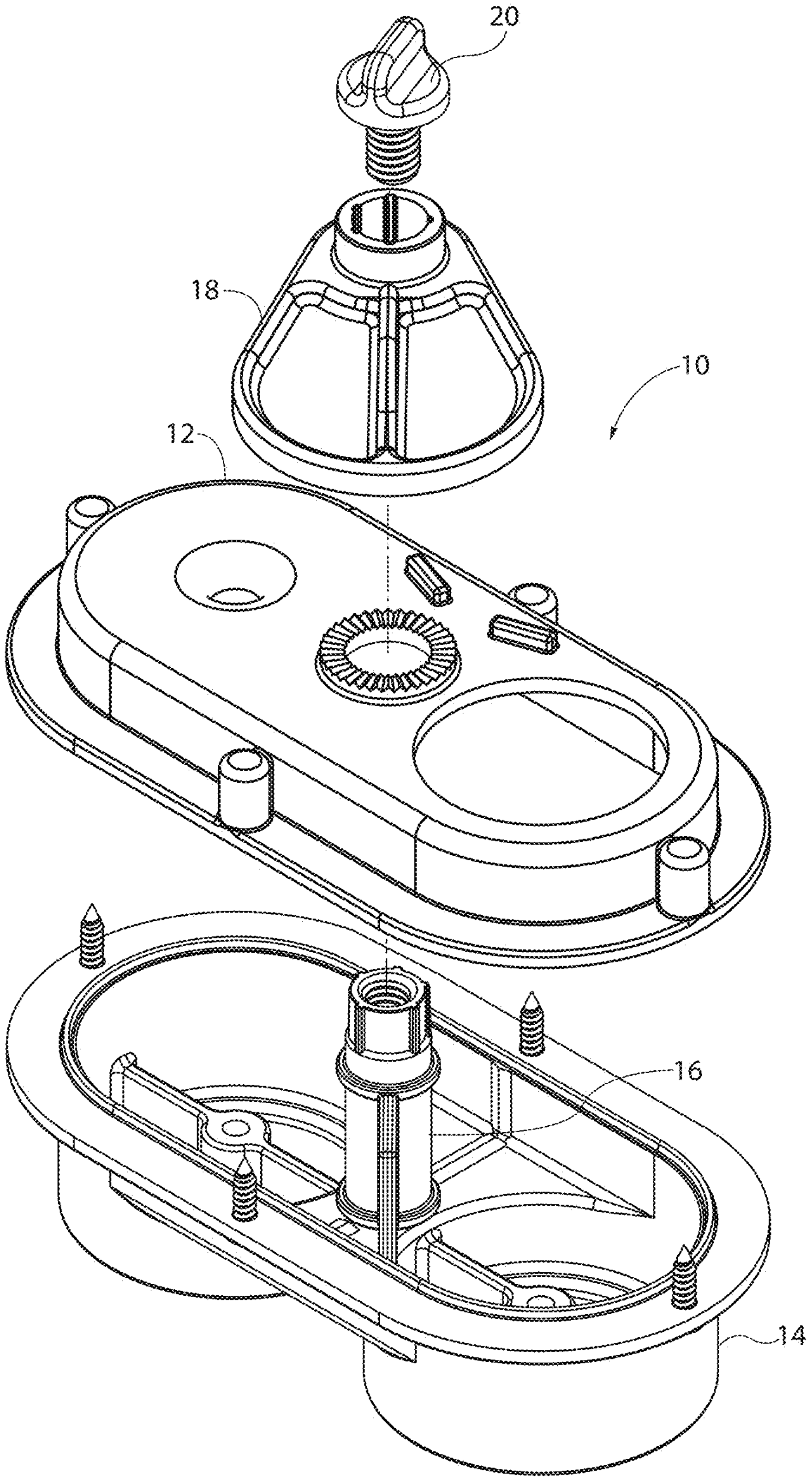
FIG. 13 is an exploded, perspective view of the main drain diverter valve assembly of FIG. 2, showing the position of the butterfly valve when the door valve is rotated approximately 45 degrees clockwise from its fully closed position.

FIG. 13 shows the door valve 18 rotated 45 degrees clockwise from the fully closed position, which corresponds to the butterfly valve 16 being rotated 45 degrees clockwise from its fully open position, which corresponds to both valves being partially, about ½, open. In this valve state, partial suction is applied to both the main drain 3 and the skimmer 4 which corresponds to partial water flow through both the main drain 3 and the skimmer 4.

FIG. 14 shows the door valve 18 rotated 90 degrees clockwise from its fully closed position to its fully open position, which corresponds to the butterfly valve 16 being rotated 90 degrees clockwise from its fully open position to its fully closed position. In this valve state, no suction is applied to the main drain 3 and maximum suction is applied to the skimmer 4 which corresponds to no water flow through the main drain 3 and maximum water flow through skimmer 4.

FIG. 15 shows the door valve 18 rotated 135 degrees clockwise from its fully closed position. In this position, the door valve 18 remains fully open and the butterfly valve 16 has rotated 135 degrees clockwise from its fully open position to a position where it is partially open. In this valve state, partial suction is applied to the main drain 3, which results in partial water flow through the drain. While partial suction is applied to the skimmer 4, in this valve state, this results in maximum water flow through the skimmer.

Figure 16:
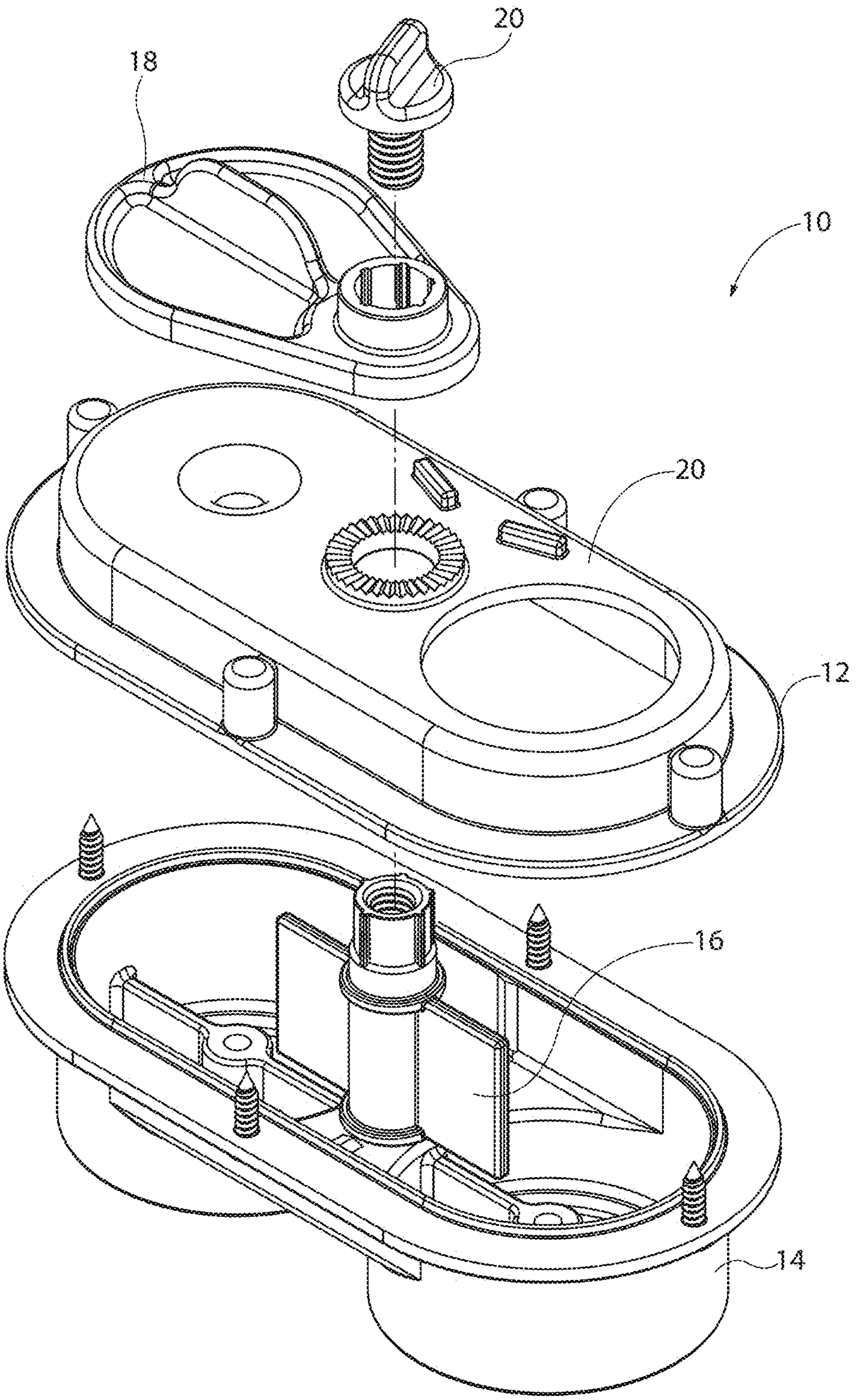
FIG. 16 is an exploded, perspective view of the main drain diverter valve assembly of FIG. 2, showing the door valve and top cover in phantom line, for the purpose of illustrating the position of the butterfly valve when the door valve is rotated approximately 180 degrees from the fully closed position.
Figure 17:
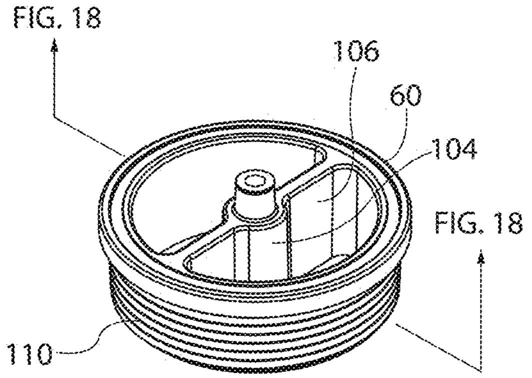
FIG. 17 is a top view of an adapter suitable for use in mounting the main drain diverter valve assembly of the present invention in a skimmer housing.
Figure 18:
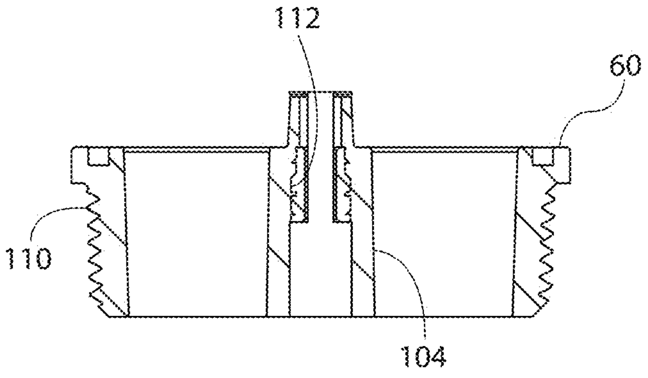
FIG. 18 is a cross-sectional view of the adapter of FIG. 17 taken along the 18-18 of FIG. 7.

FIG. 16 shows the door valve 18 rotated 180 degrees clockwise from its fully closed position, which is another position where the door valve 18 remains fully open. Correspondingly, the butterfly valve is rotated 180 degrees from its first fully open position to its second fully open position. In this valve state, partial suction is applied to the main drain 3, which results in maximum water flow through the main drain in this valve state. Partial suction is also applied to the skimmer 4, but results in maximum water flow through skimmer.

The components of the main drain diverter valve assembly 10 may be formed from polymeric materials, such as ABS, PVC, or other corrosion-resistant plastics suitable for prolonged exposure to chlorinated or chemically treated pool water. Graphite or carbon fiber composites may also be suitable.

The disclosed main drain diverter valve assembly 10 of the present invention provides a durable, easy-to-use solution for controlling suction balance and water flow in swimming pool circulation systems. By offering multiple, selectable flow modes and compatibility with existing skimmer housings, the invention improves pool maintenance efficiency and user convenience.

The disclosed main drain diverter valve assembly 10 provides among other features: (1) a linked dual valve system—the mechanically linked butterfly valve 16 for main drain control and door valve 18 for skimmer control, with synchronized movement through a splined interface, i.e. external splines 82 and internal splines 86: (2) single-knob control—flow balance is adjustable between two suction paths (i.e. main drain and skimmer) using a single locking knob 20 rather than multiple valves; (3) a locking feature 100 which prevents accidental misadjustment—the serrated interface between the door valve 18 and top cover 12, lockable via locking knob 20; (4) compact integration—the main drain diverter valve assembly 10 being installable directly in a skimmer rather than in external plumbing; (4) a removable retention system—threaded adapters 60 with O-rings and screws secure the main drain diverter valve assembly 10 to standard skimmer ports while allowing removal for service; and (5) Multiple flow positions—the linkage geometry allowing for distinct flow states, enabling precise tuning of skimmer-to-drain balance, as shown in FIGS. 12-16.

The disclosed main drain diverter valve assembly 10 provides at least the following functional and commercial advantages: simplified flow adjustment between skimmer and drain; reduced need for external diverter valves or multiple fittings; allows service personnel to quickly adjust flow at the skimmer; provides a secure, repeatable lock-in-place setting; and, is compatible with existing skimmer housings.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. A diverter valve assembly for use in a swimming pool skimmer, comprising:
- a housing having a skimmer inlet, a main drain inlet, a pump outlet and a locking feature;
- a door valve operable to control water flow through the skimmer inlet to the pump outlet;
- a butterfly valve operable to control water flow through the main drain inlet to the pump outlet;
- wherein the door valve and the butterfly valve are physically interconnected by means of a splined connection such that door valve and butterfly valve move in unison;
- wherein the locking feature comprises a plurality of serrations formed on the door valve which mate with a plurality of serrations formed on the housing which are engageable by means of a knob to lock the door valve and the butterfly valve in one of a plurality of positions; and
- wherein each of the plurality of positions corresponds to a different distribution of suction and water flow between the skimmer inlet and the pump outlet and the main drain inlet and the pump outlet.

2. The diverter valve assembly for use in a swimming pool skimmer of claim 1, wherein the plurality of positions includes a maximum skimmer flow position, a maximum main drain flow position, and a combined-flow position.

3. The diverter valve assembly for use in a swimming pool skimmer of claim 1, wherein the housing comprises a top cover and a bottom cover.

4. The diverter valve assembly for use in a swimming pool skimmer of claim 3, wherein the bottom cover includes a first well and a second well, wherein the first well includes the main drain inlet.

5. The diverter valve assembly for use in a swimming pool skimmer of claim 3, wherein the top cover includes the skimmer inlet.

6. The diverter valve assembly for use in a swimming pool skimmer of claim 1, further including adapters configured to be installable in internal ports of a skimmer and configured to attach to the housing.

7. A diverter valve assembly for use in a swimming pool circulation system, comprising:

a housing having a skimmer inlet, a main drain inlet, an outlet and a locking feature;

a door valve operable to control water flow through the skimmer inlet to the outlet;

a butterfly valve operable to control water flow through the main drain inlet to the outlet;

wherein the door valve and the butterfly valve are physically interconnected such that door valve and butterfly valve move in unison;

wherein the locking feature is configured to lock the door valve and the butterfly valve in one of a plurality of positions; and wherein each of the plurality of positions corresponds to a different distribution of suction and water flow between the skimmer inlet and the outlet and the main drain inlet and the outlet.

8. The diverter valve assembly for use in a swimming pool circulation system of claim 7, wherein the plurality of positions includes a full skimmer flow position, a full main drain flow position, and a combined-flow position.

9. The diverter valve for use in a swimming pool circulation system of claim 7, wherein the door valve and butterfly valve are interconnected by means of a splined connection.

10. The diverter valve assembly for use in a swimming pool circulation system of claim 7, wherein the locking feature comprises a plurality of serrations formed on the door valve which mate with a plurality of serrations formed on the housing and wherein a knob is configured so as to engage with the door valve and the butterfly valve to cause the plurality of serrations on the door valve to engage the plurality of serrations on the housing.

11. The diverter valve assembly for use in a swimming pool circulation system of claim 7, wherein the housing comprises a top cover and a bottom cover.

12. The diverter valve assembly for use in a swimming pool circulation system of claim 11, wherein the bottom cover includes a first well and a second well, wherein the first well includes the main drain inlet and the second well includes the outlet.

13. The diverter valve assembly for use in a swimming pool circulation system of claim 11, wherein the top cover includes the skimmer inlet.

14. The diverter valve assembly for use in a swimming pool circulation system of claim 7, further including adapters configured to be installable in the internal ports of a skimmer and configured to attach to the housing.

15. A diverter valve assembly, comprising:

a housing having a first inlet, a second inlet, an outlet and a locking feature;

a first valve operable to control water flow through the first inlet to the outlet;

a second valve operable to control water flow through the second inlet to the outlet;

wherein the first valve and the second valve are physically interconnected such that the first valve and the second valve move in unison;

wherein the locking feature is configured to lock the first valve and the second valve in one of a plurality of positions; and wherein each of the plurality of positions corresponds to a different distribution of suction and water flow between the first inlet and the outlet and the second inlet and the outlet.

16. The diverter valve assembly of claim 15, wherein the plurality of positions includes a maximum flow position through the first valve, a maximum flow position through the second valve, and a combined-flow position through both the first and second valves.

17. The diverter valve assembly of claim 15, wherein the first valve and the second valve are interconnected by means of a splined connection.

18. The diverter valve assembly of claim 15, wherein the locking feature comprises a plurality of serrations formed on the first valve which mate with a plurality of serrations formed on the housing which are engageable by means of a knob to lock the first valve and the second valve in one of a plurality of positions.

19. The diverter valve assembly of claim 15, wherein the housing comprises a top cover and a bottom cover.

20. The diverter valve assembly of claim 19, wherein the top cover includes the first inlet and the bottom cover includes the second inlet and the outlet.

* * * * *